United States Patent [19]
Ginaven

[11] 3,794,164
[45] Feb. 26, 1974

[54] HOPPER TYPE SEPARATING AND CLASSIFYING DEVICE

[75] Inventor: Marvin E. Ginaven, Springfield, Ohio

[73] Assignee: The Beuer Bros. Co., Springfield, Ohio

[22] Filed: Dec. 21, 1970

[21] Appl. No.: 100,153

[52] U.S. Cl. ................ 209/243, 209/274, 209/305, 209/353, 210/499
[51] Int. Cl. ........................................... B07b 1/06
[58] Field of Search ... 209/393, 352, 268, 305, 306, 209/273, 274, 281, 407; 210/433, 499, 240, 243, 353

[56] References Cited
UNITED STATES PATENTS

| | | | |
|---|---|---|---|
| 744,390 | 11/1903 | Osborne | 209/281 X |
| 788,219 | 4/1905 | Ogle | 209/306 |
| 1,644,121 | 10/1927 | Greene | 209/393 X |
| 2,855,099 | 10/1958 | De Koning | 209/273 |
| 2,917,174 | 12/1959 | Fontein | 209/273 |
| 3,259,244 | 7/1966 | Kaljo | 209/281 X |
| 3,303,769 | 1/1968 | Wilmot | 210/433 X |
| 3,452,876 | 7/1969 | Ginaven | 210/433 X |

FOREIGN PATENTS OR APPLICATIONS

| | | | |
|---|---|---|---|
| 678,037 | 1/1964 | Canada | 209/274 |
| 538,448 | 3/1957 | Canada | 209/274 |

*Primary Examiner*—Robert Halper
*Attorney, Agent, or Firm*—Jerome P. Bloom

[57] ABSTRACT

Apparatus for separating and/or classifying liquids and solids characterized by a hopper type receptacle defining a generally vertical flow channel. The receptacle is distinguished by an interior wall portion providing a flow surface formed to cause fluid to adhere thereto and pass through apertures defined therein and further having a construction to produce a pressured turbulence in a fluid flow whereby to cause additional fluid to move through said apertures.

8 Claims, 4 Drawing Figures

PATENTED FEB 26 1974
3,794,164
SHEET 1 OF 2
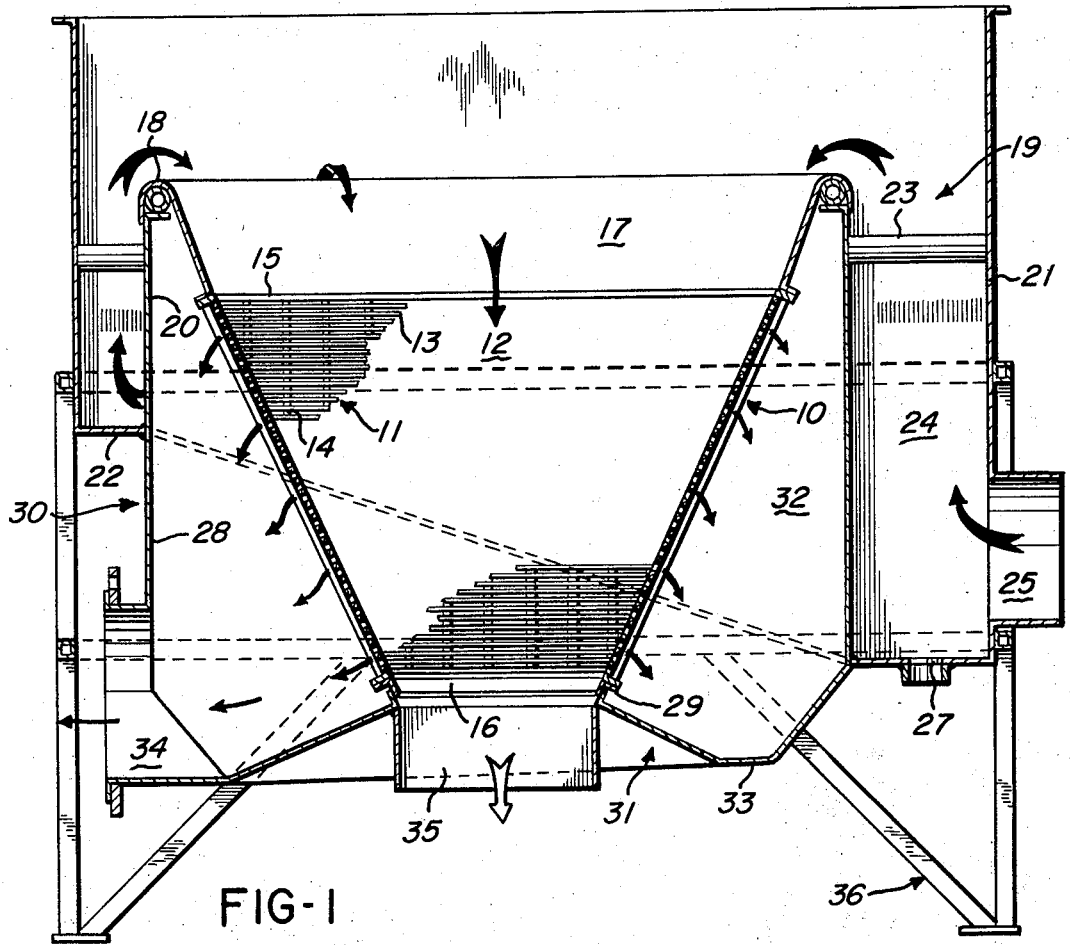
FIG-1
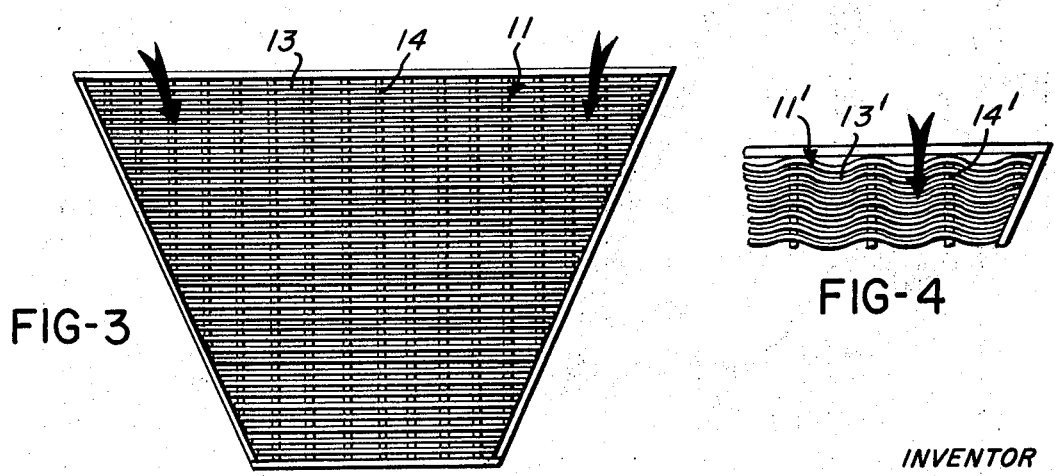
FIG-3
FIG-4
INVENTOR
MARVIN E. GINAVEN
BY Jerome P. Bloom
ATTORNEY 3,794,164

HOPPER TYPE SEPARATING AND CLASSIFYING DEVICE

BACKGROUND OF THE INVENTION:

This invention relates to improvements providing for simple, economical and more effective separation and classification of the constituents of fluid mixtures. Though not so limited in application, by way of example it will be particularly described in reference to its use in a device for separating liquids from solids.

The prior art reveals a great variety of side hill screens directed to the separation and classification of liquids and solids of various character. Their use has been due primarily to the simple and inexpensive nature of their construction. However, their application, of necessity, has been limited since their capacity is directly related to their size. In general, it can also be said that side hill screens have not functioned well where high volume flow and high efficiency characteristics are described.

The present invention utilizes a basic side hill screen concept but carries the art forward to simply and effectively overcome the previous recognized limitations of side hill screens. Moreover, it provides a unique separating and classifying device which for its size has an unexpected capacity and efficiency.

SUMMARY OF THE INVENTION:

The invention, in a preferred embodiment, provides a hopper-like device forming a downwardly convergent flow channel over wall portions of which a fluid mixture may be moved in a sheet-like flow and in the course of such flow be subjected to dual separating influences. The first influence is basic and provided by the flow surface of the channel wall portions being distinguished by slots or spaced apertures, preferably throughout their length. The second influence derives from the fact that the channel wall portions are so formed to provide first for a surface adherent thin sheet-like flow and then for the flow to be constricted in a manner to produce lateral pressure influences thereon. The net result of this dual influence is to produce a rapid and considerable separation from the flow of the portions thereof which tend to move closely adjacent the hopper wall. As will be described, the action and the quality of separation produced is such as to enable a relatively small hopper-type unit as prescribed to handle an extremely high volume flow and to produce desired results in a short period of time and with considerable efficiency.

It is a primary object of the invention to provide an improved screening device useful for separating and classifying purposes which is more economical to fabricate for its capacity, more efficient and satisfactory in use, adaptable to a high variety of applications and unlikely to malfunction.

A further object of the invention is to provide a unique hopper-type device useful for separating and/or classifying purposes.

Another object of the invention is to provide an improved screen structure in the use of which there are dual operating influences enabling more rapid and more effective separation thereby of the constituents of a fluid flow than would normally be anticipated.

An additional object of the invention is to provide a separating and/or classifying device of the character described possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a vertical cross section of a device in accord-ance with the invention;

FIG. 3 shows a plan view of one embodiment of a wall segment utilized in the hopper structure of FIGS. 1 and 2; and FIG. 4 shows a modification of the wall segment to be utilized in constructing the hopper of FIGS. 1 and 2.

Like parts are indicated by similar characters of reference throughout the several views.

Figure 2:
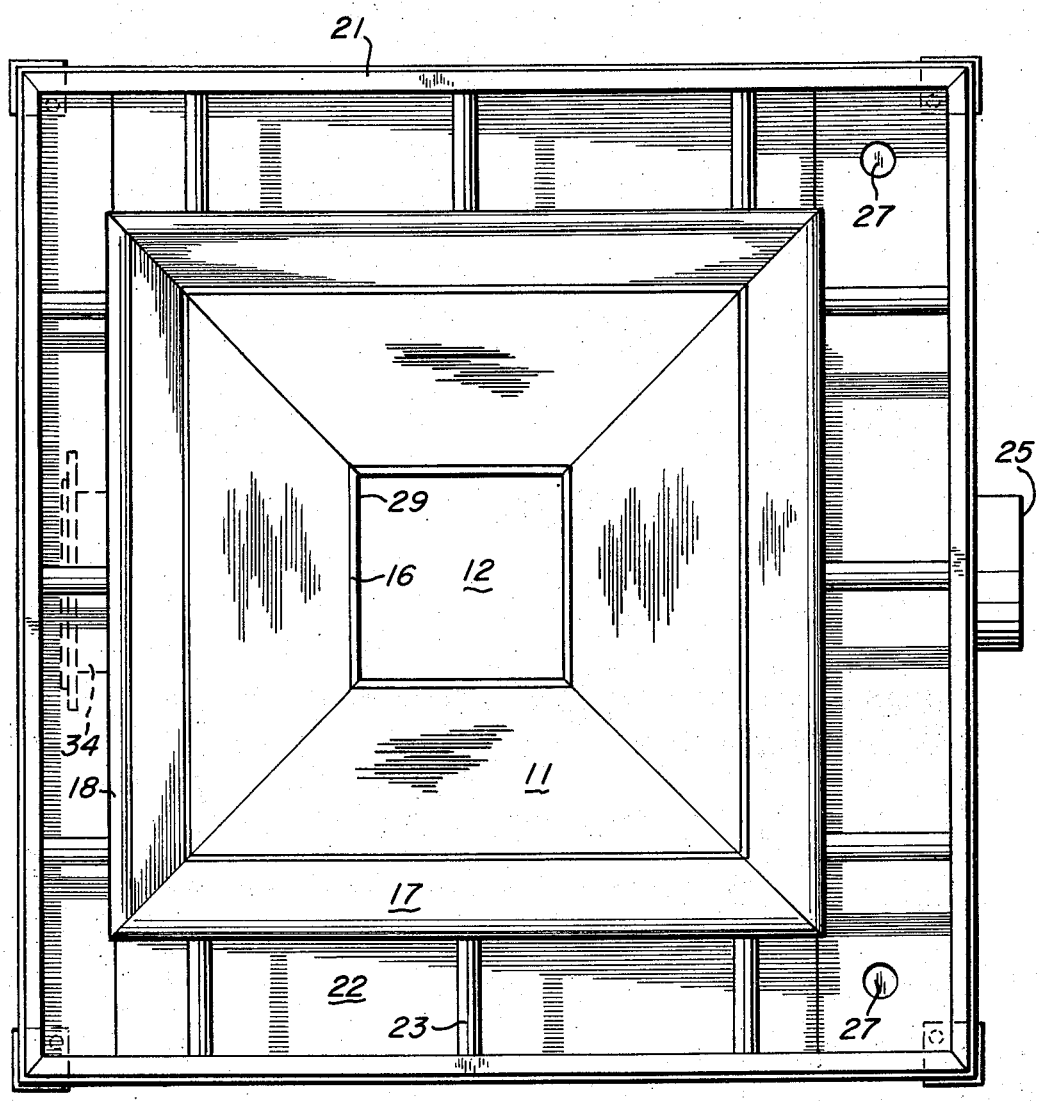
FIG. 2 is a top plan view thereof.

BRIEF DESCRIPTION OF THE PREFERRED EMBODIMENT OF THE INVENTION ILLUSTRATED:

Referring now to the illustrative embodiment of the invention revealed in the accompanying drawings, there shown is a hopper-type receptacle 10. The receptacle 10 is constructed of an open frame mounting as its sides four plate units 11 of identical trapezoidal shape with touching or contiguous edges. The plate units have their base portions uppermost and are suitably interconnected to provide a generally vertical flow channel 12 which gradually and uniformly converges from top to bottom. It should be noted that in a horizontal sense the channel 12 is, in this instance, distinguished by a generally rectangular cross section. The receptacle 10 provides a channel-like structure which is constructed in inverted frusto-pyramidal form, open through its base to its apex ends in defining a vertical flow channel.

Accordingly, as shown in FIG. 3, each side of hopper 10 is comprised of a pheripheral frame portion transversely bridged from top to bottom by closely adjacent, vertically spaced wires or thin bar segments 13. These wire segments are preferably triangular in cross section and have their apex portions mounted on and backed by longitudinally extending transversely spaced underlying support rods 14. The plate units 11 thus provide an interior wall for the structure 10 wherein the inner base surfaces of the wires 13 of each plate 11 defines a flow plane. Due to the transversely spaced positions of the generally vertically oriented longitudinally extending rods 14, there is presented in each flow plane a series of longitudinally and laterally spaced, laterally elongated, slots. A flow channel is thus defined by the hopper 10, wall segments or portions of which are angularly displaced with reference to each other to individually and mutually function in a manner to be further described. In the particular embodiment illustrated the flow channel is uniformly rectangular in transverse section. Thus there is a rectangular entrance opening 15 at the top which is substantially enlarged as compared to the rectangular discharge opening 16 at its convergent bottom.

At its entrance opening 15, the upper edge of the hopper 10 is rimmed by a continuous apron 17. The apron is of a generally rectangular configuration and comprised of four segments respectively having a slope consistent with the plate unit 11 of the hopper 10 to which it connects and of which it forms an upwardly directed extension. The upper peripheral edge portion of apron 17 is bent outwardly and then down to form at the entrance to the apron an arcuate lip 18.

In peripherally surrounding relation to the apron 17 and the hopper 10, which depends therebelow, as an extension thereof, is a rectangular shell forming a receptacle 19. Receptacle 19 is open at its top and comprised of a rectangular inner wall 20 and, in spaced parallel relation thereto, a similarly rectangular outer wall 21, the bottoms of the walls 20 and 21 being bridged by closure plate means 22. Noting FIG. 2 of the drawings, it will be seen that the upper edge of the wall 20 connects coextensively with and extends downwardly from the outer dependent portion of the lip 18 of the apron 17. Note also that positioned in spaced relation about and spaced immediately below the lip 18 are rigidifying bars 23 which serve to interconnect and maintain a spaced parallel relation of the receptacle walls 20 and 21.

There are further distinguishing features of the receptacle 19 evidenced in the showing of FIG. 2. For example, the outer wall 21 projects in a sense upwardly of the inner wall 20 and the receptacle 19 defines a chamber 24 and provides a feeding tank which depends peripherally about the apron 17 to be deeper at one side thereof than the other. At the lowermost portion of the wall 21 the receptacle 19 has an inlet 25 and adjacent thereto the closure plate means 22 is provided with drain openings. The latter are normally closed by plugs 27. In use of this structure the inner wall 20 functions with the apron lip 18 as a weir. Thus, when a mixture of liquids and solids, such as a low consistency pulp slurry, for example, is delivered under pressure, the mixture will quickly fill the chamber 24 and then move over the lip 18 and onto the apron 17 in a thin sheet-like flow. Due to the rectangular displacement of the respective apron sides, the flow will, in this instance, be divided into four segments.

Looking again to FIG. 1 of the drawings, an extension 28 of the rectangular inner wall 20 depends to form a skirt 30 in surrounding spaced relation to the hopper 10. Bridging the space between a rectangular collar 29 rimming the outlet 16 of the hopper 10 and the dependent extremity of the wall extension 28 is a bottom plate structure 31 which forms therewith, immediately about the hopper 10, an effluent discharge chamber 32. Note that the plate structure 31 is distinguished in cross section by a tray-like configuration, the portion 33 thereof positioned centrally between the collar 29 and wall extension 28 being depressed. Tubular conduit means 34 connect to define an outlet formed in a lowermost portion of the wall extension 28 and the inclined outer side portion of the bottom plate structure 31. So oriented, the conduit means 34 provides a discharge passage the opening to which is at least partially below the lower extremity of the hopper 10. Also, in connection with the collar 29 and vertically dependent to define a discharge passage leading from the hopper discharge opening 16 is a tubular discharge chute 35. As may be particularly seen in FIG. 2, the described structure including the hopper 10, apron 17, receptacle 19 and the wall portions which define the chamber 32 are supported in elevated spaced relation to ground surface by an open framework 36. Since the details of the framework are conventional and within the skill of a mechanic versed in the art, they will not be further described. Suffice it to say that the nature of the open framework is such to facilitate free access for plumbing connections to the inlet 25 and from the discharge conduit or chutes 34 and 35.

As will be observed, the entire unit has no moving parts. To understand the importance of its construction and its advantageous function, consider its application for purpose of dewatering a low consistency pulp slurry, by way of example. In such instance, a delivery conduit will be connected to the inlet 25 for the purpose of delivering to the receptacle 19, under pressure, a low consistency slurry in a high volume flow. Moving through the inlet 25, the slurry will rapidly build up in the chamber 24 defined between the wall structures 20 and 21 to a level it will soon overflow the lip 18 of the apron 17. As the slurry including fibrous particles and entraining liquid moves over the lip 18, it will move downwardly, simultaneously, of the four segments of the apron 17. In the pressured overflow of the pulp slurry onto the apron 17 there is produced, by the structure provided, a down flow, which is initially in four well defined, thin, sheet-like segments. As will be self evident, the flow surface for each segment of the sheet-like flow is defined by one sloping side surface portion of the apron 17 and the upper surfaces of the wires 13 of the plate unit 11 which forms an extension of the particular apron segment. The flow is relatively non-turbulent as it moves down the upper broader portions of the plate units 11, through the lateral extremities of the flow segments do merge. In the course of its flow the fibrous content of the low consistency slurry is inherently induced to move to the upper surface of the sheet-like flow while liquid content, relatively free of fibers, tends to follow closely the slotted surface defined by wires 13. The liquid most adjacent the wires 13 tends to cling thereto and follow a natural course, which induces a substantial proportion thereof to exit through the slots of the plate units 11 to chamber 32. This quickly produces a substantial thickening in the continuing portion of the sheet-like flow. Due to the lateral extremities of the plate units being convergent in a downward sense, the relatively thickened slurry moving to the discharge opening 16 of the hopper 10 is caused to rapidly increase in depth. The net result of this is that the increasingly higher consistency slurry in the form of narrowing sheet segments of the flow are by their greater depth brought into considerably greater contact, thereby producing turbulence in the lower end of the flow channel 12. This turbulence results in lateral pressure effects directed outwardly on the higher consistency slurry mass to force additional liquid through the slots in the plate units 11. This supplements the natural evacuation of liquid from the flow inherent in the contact thereof with the flow surface of the wires 13. In this manner there is insured that there is not only a substantial removal of liquid from the flow in the upper portion of the hopper but the higher consistency slurry which moves to the convergent throat defined at the lower end of the hopper is acted on for additional dewatering most effectively, to the extent that there issues from the hopper a slurry of considerable higher consistency than that which entered. The movement of the slurry in its sheet-like flow through the hopper in relatively angularly displaced sheet segments is expedited by the function of the hopper walls as defined by the plate units 11 to the extent that the unit is capable of handling a substantially higher volume of flow than would normally be anticipated from the knowledge of the practice in the art of utilizing side-hill screen segments for similar purposes. It is emphasized that the nature and the configuration of the interior wall or flow channel of the hopper described produces a fast and effective discharge of high consistency slurry and simultaneously a rapid evacuation of extracted effluent. It will be realized, of course, that the fluid subjected to the separation may be other than a fluid mixture such as a pulp slurry and the unit may act accordingly, in the process of its separating function, as a classifying medium.

It is noted that it is contemplated that each of the plate units 11 may consist of a peripheral frame which receives in readily releasable engagement therein a screen section comprised of the bars 13 and 14 as described.

Specialized advantages in use of a hopper device as above constructed may be achieved if one were to use for the hopper side wall a screen section such as shown in FIG. 4 of the drawings. As there seen, instead of bars 13 which extend in straight lines directly transverse to flow, one may utilize bar or wire segments 13' which, between adjacent support rods 14', will depart from a straight line in a single uniform curve the apex of which is directed in a sense of flow. Of course, the segments 13' may be continuously interconnected from one side of a plate to another in the form of a single wire or thin bar unit. The advantages of the described bars or wires 13' which may also be generally triangular in cross section are that in use thereof there is an even more rapid removal of fluid from the flow surface defined by the arc formed base portions of the wires 13'. The adhering liquid flows rapidly to and over the apex portions thereof.

Preferred embodiments have been above described. However, as previously noted it is to be understood that the cross section of the flow channel 12 defined by the hopper 10 need not necessarily be rectangular in cross section to achieve improved results in accordance with the invention. The cross section of the interior wall of the hopper may be circular and may be of other multilateral form with attendant benefits. The concept is that there will be in the downward flow defined sheet portions which rapidly become of higher consistency and/or greater depth and converge to intermingle in a turbulent fashion and produce the additional effects to amplify and increase, in a rapid fashion, the separating or thickening capacity of the unit.

Note should be taken that it has been found that the angle of deviation of the wall segments of the hopper is of some importance in the efficiency and effectiveness of the invention embodiments. Optimal results have been obtained for some applications in instances where the sides of the channel 12 such as provided by plate segments 11 are inclined from a vertical at an angle ranging from about 18° to about 35°.

Accordingly, simple though the aforementioned structure might be, it produces a dewatering, separating or classifying device having an extremely high capacity and occupying a minimal space. Further, the invention provides a device of this character which may be more effectively utilized and simply interconnected with any system using a minimal of plumbing. Apart from the foregoing, invention units lend themselves to considerable economy of capital cost, easy inspection and maintenance and manual or automatic control. To top all the foregoing, the composite arrangement of the plate units as provided enables them to mutually function in a more effective manner than heretofore contemplated for simple screen sections.

As a notation of the importance of the invention, consider the pollution problem. A device such as above described can be very inexpensively applied to the extremely difficult problem of separating solids in sewage and facilitate the reclamation of wastes as well as rapidly and inexpensively to clarify the water embodying the waste, facilitating its purification procedure.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

I claim:

1. Apparatus for separating and/or classifying components of a mixture of liquids and solids having a fluid consistency, comprising means including a plurality of screen segments inclined from the vertical connected in a side-by-side contiguous relation each said segment comprising a series of closely adjacent, longitudinally extending, vertically spaced bars, and transversely spaced, underlying longitudinally extending supports that together define apertures there between each said segment having a substantially planar sheet-like flow surface, the lateral extremities of segments being angularly displaced from the upper to the lower ends thereof to form a convergent channel; means connected to, extending upwardly from the upper ends of said screen segments, and at the same inclination to feed said mixture on to the respective flow surfaces of said segments and in a sense downwardly thereof in thin sheet-like flows, the flow surface formed by the bars of each said segment being shaped to influence an adherence of said mixture and a continuing separation of liquid portions of the mixture through the apertures therein in the course of its downward flow channel-like areas being formed at the adjacent lateral extremities of said screen segments whereby the flows on the respectively adjacent surfaces thereof intermingle in successively increasing amount as the mixture moves down said flow surfaces to induce increasing turbulence in said channel-like areas to thereby force further separation of selected portions of said mixture in the course of its continuing flow, and there being means for separately discharging the separated portions of the mixture.

2. Apparatus for separating and/or classifying components of a mixture of liquids and solids having a fluid consistency, including an apertured hopper type receptacle the interior wall surface of which is convergent from an inlet opening at the top to a relatively reduced outlet opening at the bottom, means defining a feeding tank in surrounding relation to said receptacle, said feeding tank accommodating a supply of said mixture and being connected to discharge said mixture on to the interior wall surface of said receptacle in thin sheet-like flows of an upward imperforate extension of said receptacle, which is in alignment therewith and has the same convergency said apertured hopper comprising a series of closely adjacent, longitudinally extending vertically spaced bars, and transversely spaced, underlying longitudinally extending supports said bars being shaped to influence portions of the mixture of the sheet-like flow to follow the contours thereof and exit through said apertures while the remainder of the mixture including a relatively high consistency fraction continues toward said outlet opening, means forming an effluent discharge chamber in surrounding relation to said receptacle and in direct communication with the apertures in said interior wall surface and said discharge chamber being separated from said feed tank and the outlet opening of said receptacle.

3. Apparatus according to claim 2, wherein said upward extension of said receptacle is defined by a substantially continuous lip providing for smooth uniform overflow from said feed tank into said receptacle, skirt means dependent from said lip and spaced from said receptacle serving in part to define said effluent discharge chamber and to separate said chamber from said feed tank.

4. Apparatus according to claim 3, wherein said feed tank is in a surrounding relation to said effluent discharge chamber and has portions of unequal depth, an inlet to said feed tank being in a portion of greater depth adjacent the bottom thereof.

5. Apparatus according to claim 2, wherein said hopper receptacle is square-like in cross section, the sides being contiguous and having an identical trapezoidal configuration with their broader ends at the inlet end of the receptacle and their smaller ends at the outlet end, said smaller ends combining to form the outlet end of the receptacle.

6. Apparatus according to claim 2, wherein said hopper type receptacle has a frusto-pyramidal configuration in inverted orientation and is open from end to end to define convergent angularly displaced contiguous walls each similarly apertured, the base of the receptacle forming its inlet end and the apex forming the outlet end.

7. Apparatus according to claim 6, characterized by a lip formed continuous around the base of said receptacle over which the fluid mixture from said feed tank flows, flow through the receptacle taking the form of separate sheet-like streams over the respective walls which streams at their contiguous edges become progressively more turbulent as they approach said apex.

8. Apparatus for separating and/or classifying components of a mixture of liquids and solids having a fluid consistency including a hopper type receptacle the interior wall surface of which is convergent from an inlet opening at its top to a relatively reduced outlet opening at its bottom, said interior wall surface comprising a plurality of contiguous, screen segments inclined from the vertical, each said segment comprising a series of closely adjacent, longitudinally extending, vertically spaced bars, and transversely spaced, underlying longitudinally extending supports that together define apertures therebetween, characterized by means extending upwardly from said wall surface and connected thereto at the same inclination from the vertical as said screen segments for feeding said fluid mixture into a flow channel defined by said interior wall surface in a manner to induce the mixture to move down over said wall surface in thin sheet-like flows, means separated from said outlet opening defining an effluent receiving chamber in communication with the apertures in said interior wall surface, and said interior wall surface being formed to provide that the initial flow of said mixture through said channel is non-turbulent and flow at the lower end of said channel is turbulent whereby to induce a continuing and highly effective displacement of liquid from said mixture to said effluent receiving chamber.

* * * * *

UNITED STATES PATENT OFFICE
CERTIFICATE OF CORRECTION

Patent No. 3,794,164          Dated February 26, 1974

Inventor(s) Marvin E. Ginaven

It is certified that error appears in the above-identified patent and that said Letters Patent are hereby corrected as shown below:

The name of the assignee is corrected to read -- The Bauer Bros. Co. --.

Column 1, line 20, "described" is corrected to read -- desired --.

Column 4, line 34, "through" is corrected to read -- though --.

Column 6, line 39, (Claim 1, line 5) a comma is inserted after "relation".

Column 6, line 43, (Claim 1, line 9) a comma is inserted after "between".

Column 6, line 45, (Claim 1, line 11) the word -- said -- is inserted before "segments".

Column 6, line 47, (Claim 1, line 13) the semi-colon is changed to a comma.

Column 6, line 56, (Claim 1, line 22) a comma is inserted after "flow".

Claim 2 (Columns 6 and Columns 7) is corrected to read as follows:

2. Apparatus for separating and/or classifying components of a mixture of liquids and solids having a fluid consistency, including an apertured hopper type receptacle the interior wall surface of which is convergent from an inlet opening at the top to a relatively reduced

UNITED STATES PATENT OFFICE
CERTIFICATE OF CORRECTION

Page 2

Patent No. 3,794,164     Dated February 26, 1974

Inventor(s) Marvin E. Ginaven

It is certified that error appears in the above-identified patent and that said Letters Patent are hereby corrected as shown below:

outlet opening at the bottom, means defining a feeding tank in surrounding relation to said receptacle, said feeding tank accommodating a supply of said mixture and being connected to discharge said mixture on to the interior wall surface of an upward imperforate extension of said receptacle, which is in alignment therewith and has the same convergency as said receptacle, in thin sheet-like flows, said apertured hopper comprising a series of closely adjacent, longitudinally extending vertically spaced bars, and transversely spaced, underlying longitudinally extending supports that together form apertures therebetween, said bars being shaped to influence portions of the mixture of the sheet-like flow to follow the contours thereof and exit through said apertures while the remainder of the mixture including a relatively high consistency fraction continues toward said outlet opening, means forming an effluent discharge chamber in surrounding relation to said receptacle and in direct communication with the apertures in said interior wall surface and said discharge chamber being separated from said feed tank and the outlet opening of said receptacle.

Signed and sealed this 22nd day of October 1974.

(SEAL)
Attest:

McCOY M. GIBSON JR.
Attesting Officer

C. MARSHALL DANN
Commissioner of Patents